J. L. SPROUSE.
LEVER.
APPLICATION FILED AUG. 13, 1915.
1,165,211.
Patented Dec. 21, 1915.
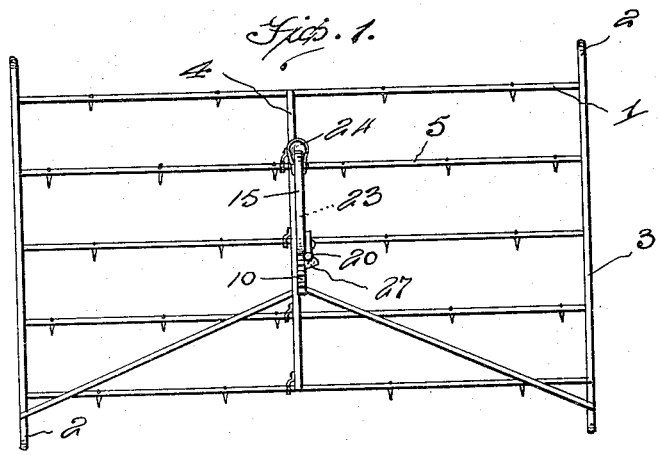
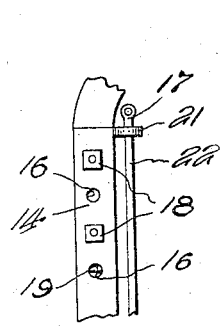
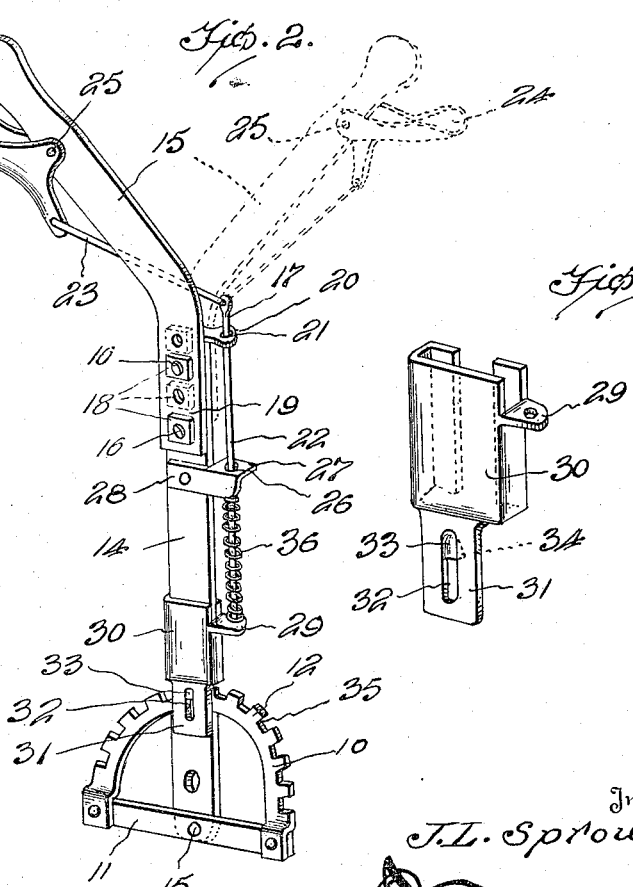
Inventor
J. L. Sprouse
COLUMBIA PLANOGRAPH CO., WASHINGTON, D. C.

UNITED STATES PATENT OFFICE.

JAMES L. SPROUSE, OF COMANCHE, OKLAHOMA, ASSIGNOR OF ONE-HALF TO NANNIE L. HUNDLEY, OF COMANCHE, OKLAHOMA.

LEVER.

1,165,211. Specification of Letters Patent. Patented Dec. 21, 1915.

Application filed August 13, 1915. Serial No. 45,339.

*To all whom it may concern:*

Be it known that I, JAMES L. SPROUSE, a citizen of the United States, residing at Comanche, in the county of Stephens and State of Oklahoma, have invented certain new and useful Improvements in Levers; and I do hereby declare the following to be a full, clear, and exact description of the invention, such as will enable others skilled in the art to which it appertains to make and use the same.

This invention relates to a lever particularly designed for use upon section harrows used for the preparing of soil for planting seeds, and the primary object of the invention is to provide a lever as specified, which is constructed so that the angled handle portion of the lever may be reversed for facilitating reverse movement of the lever and the part of the harrow to which it is connected, namely, so that the position of slant of the harrow teeth may be varied or reversed for causing separate sides of the teeth to engage the ground during their harrowing operation, thereby maintaining an even wear upon the teeth.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a plan view of a harrow, showing the improved lever attached thereto, Fig. 2 is a detail perspective view of the lever, Fig. 3 is a fragmentary side elevation of the lever, and Fig. 4 is a perspective view of a part of the lever construction.

Referring more particularly to the drawings, 1 designates a harrow of the ordinary section type, which has attaching hooks 2 formed upon each end of the end bars 3 of the harrow structure. The mid bar 4 of the harrow, to which the teeth-carrying bars 5 of the harrow are pivotally connected, has the quadrant 10 of the improved lever construction attached thereto, in any suitable manner, substantially equidistant of its ends.

The quadrant 10 is preferably of ordinary construction, being semi-circular shaped and it has a cross bar 11 secured to the lower ends of the semi-circular toothing bar 12. The body section 14 of the lever proper is pivotally connected at 15, to the cross bar 11, and it extends upwardly therefrom. The angled handle section 15 of the lever is detachably connected to the upper end of the body 14 of the lever, by bolts 16. The bolts 16 may be securely fastened to the angled handle section 15 of the lever, such as by riveting the head to the section 15, or in any other analogous manner. The bolts 16 extend through openings 17, which are formed in the upper ends of the body 14 of the lever, and they are held in place by nuts 18 which are mounted upon the bolts and engage the surface of the body 14 of the lever opposite to the one engaged by the substantially straight portion 19 of the angled handle section 15 of the lever.

The upper end of the body 14 of the lever has a transversely extending ear 20 formed integrally therewith, which ear is provided with a central opening 21, through which a pawl actuating rod 22 extends. The upper end of the rod 22 is loosely connected to a rod 23, which is in turn loosely connected to a finger grip 24. The finger grip 24 is pivotally connected at 25 to the angled end or section 15 of the lever. The rod 22 also passes through and is slidably seated in an opening 26, which is formed in an ear 27. The ear 27 is formed upon a bar 28, which is rigidly attached to the body 14 of the lever. The lower end of the rod 22 is connected to an ear 29, formed integrally with a collar 30. The ear 29 is formed by cutting free from one edge of the collar 30, as is clearly shown in Fig. 4 of the drawings. The collar 30 is formed of a single piece of sheet metal, and it is slidably mounted upon the body 14 of the lever. A tongue 31 is formed upon the lower edge of one side of the collar 30, and it has a cutout portion 32 formed therein, which alines with a depression 33. The depression 33 formed in the tongue 31, forms an inwardly extending lug 34, which is provided for seating in the notches 35 formed in the quadrant 10, for holding the lever in various adjusted positions. A spring 36, is coiled about the rod 22, and it engages the under surface of the ear 27 of the upper surface of the ear 29, for automatically moving the collar 30 downwardly upon the body 14 of the lever, for causing the lugs 34 to be seated within one of the notches 35 of the quadrant 10.

When the improved lever is applied to a harrow construction, as shown in Fig. 1 of the drawings, the quadrant 10 is attached to the center bar 4 of the harrow, centrally of its ends, so that the lever may be conveniently reached from either side of the harrow. After the harrow has been used considerably, with the teeth positioned at one angle, the section 15 of the lever may be reversed, as is shown in dotted lines in Fig. 2 of the drawings, which will permit of a reverse of the position of the harrow teeth, so that the opposite side from the one which initiatively engaged the ground, may engage the ground for wearing the teeth level during their harrowing operation.

When the angled handle section 15 of the lever is connected, as is shown in solid lines in Fig. 2 of the drawings, the bolts 16 extend through the lowermost opening 17 formed in the body 14, and the next to the top opening, and when it extends into the direction as shown in dotted lines, the bolts extend through the top and next to the bottom opening, for properly positioning the various parts of the lever for insuring the efficient operation of the same.

In reducing the invention to practice, certain minor features of construction, combination and arrangement of parts may necessitate alteration, to which the patentee is entitled, provided such alterations are comprehended within the scope of what is claimed.

What is claimed is:—

In a lever structure, the combination, of a quadrant, a lever including a body pivotally connected to said quadrant, a handle section having one portion angled being adjustably connected to the upper end of said body section for reversing the direction of the extension of the angled section of said handle lever, a rod adjustably carried by said body section, a finger grip pivotally connected to said angled handle section and connected to said rod, and a collar slidably mounted upon said body section for co-action with said quadrant, said rod being connected to said collar for sliding said collar longitudinally upon said body section upon pivotal movement of said finger grip.

In testimony whereof I affix my signature in presence of two witnesses.

JAMES L. SPROUSE.

Witnesses:
C. T. WALKER,
R. H. HILLERY.

Copies of this patent may be obtained for five cents each, by addressing the "Commissioner of Patents, Washington, D. C."